Dec. 3, 1968  B. BARRON  3,414,872
MAGNETIC TRANSMISSION LISTEN SWITCH FOR SONAR
Filed May 15, 1967  2 Sheets-Sheet 1
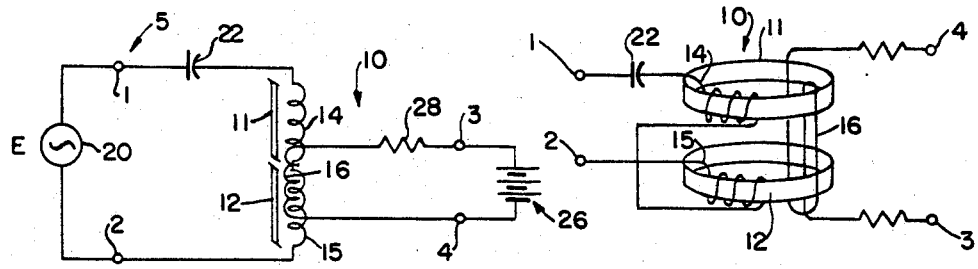
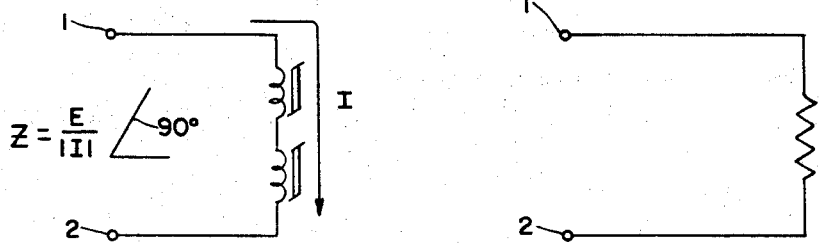
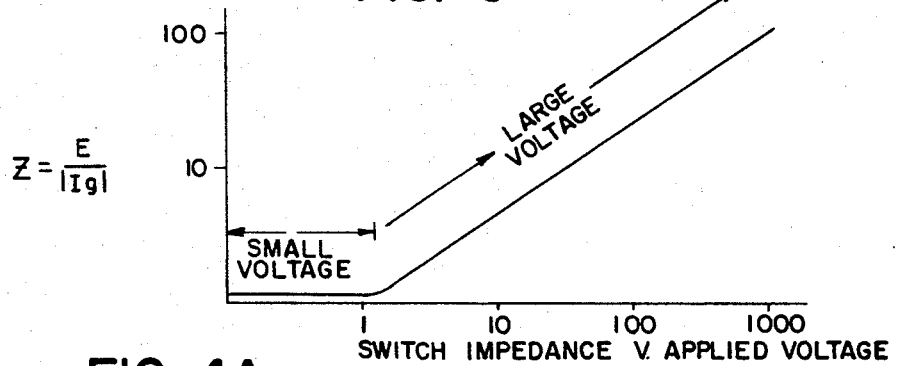
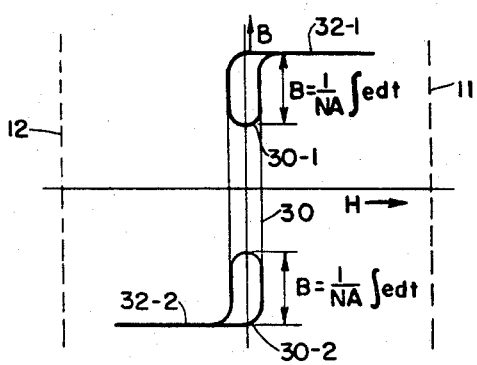
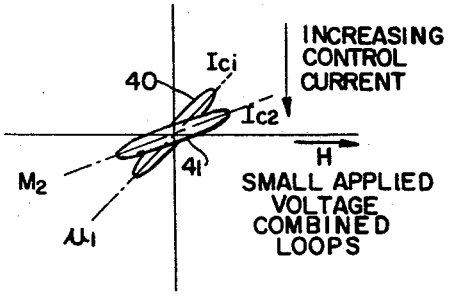

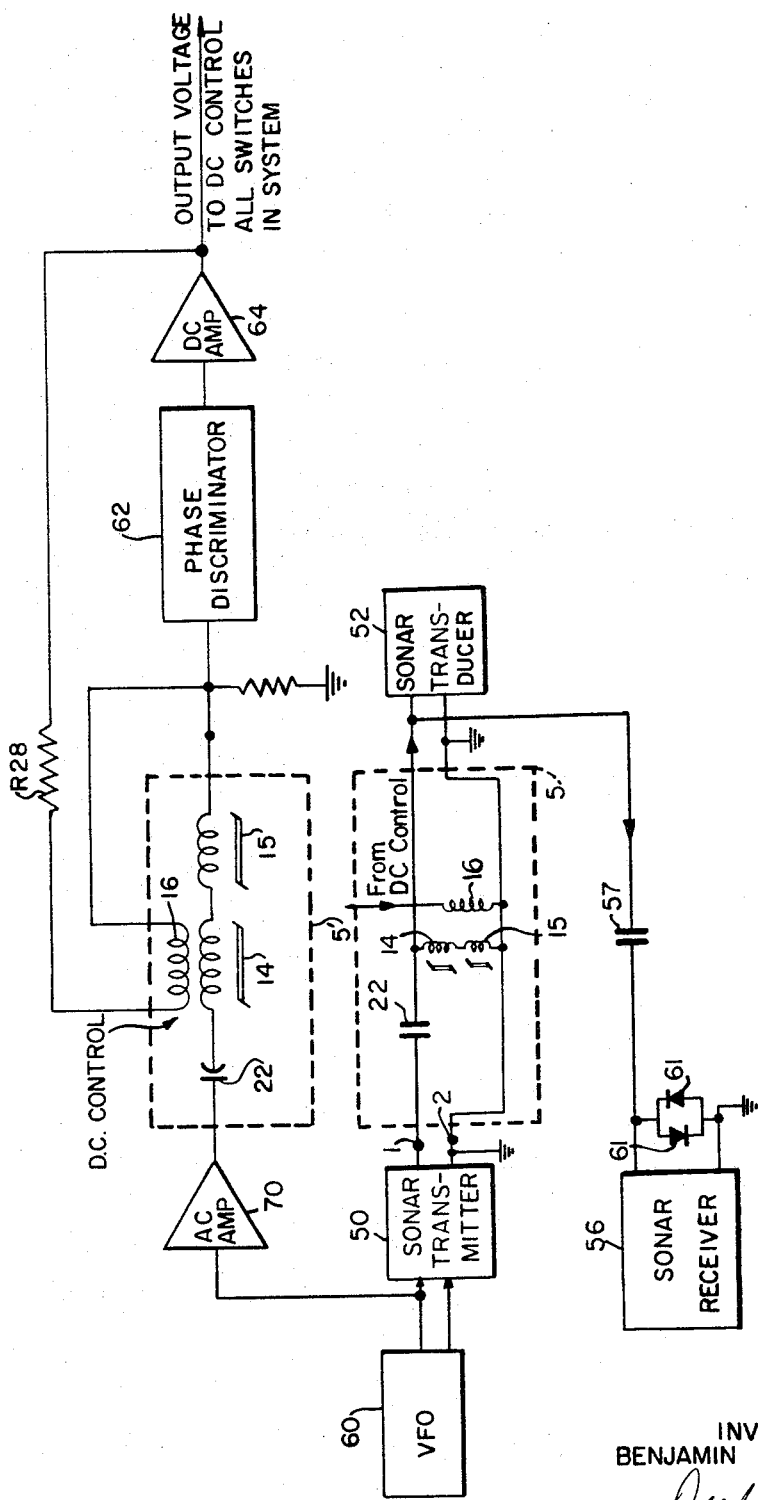

United States Patent Office 3,414,872
Patented Dec. 3, 1968

3,414,872
MAGNETIC TRANSMISSION LISTEN
SWITCH FOR SONAR
Benjamin Barron, Malba, N.Y., assignor to Lear Siegler,
Inc., Melville, N.Y., a corporation of Delaware
Filed May 15, 1967, Ser. No. 638,554
13 Claims. (Cl. 340—3)

ABSTRACT OF THE DISCLOSURE

A magnetic switch formed by a saturable reactor which is switchable from a high to a low impedance state. In a preferred embodiment the residual inductance of the switch is offset by a capacitor which forms a series resonant circuit so the switch impedance in the low impedance state is essentially its direct current resistance. The switch is particularly useful in a transmit-listen type sonar system where it effectively isolates the transmitter from the receiver under operational control of the transmitter output signal.

*Background of the invention*

In a typical active type sonar system using a single transducer or an array of transducers, a given transducer is often used for both transmitting and receiving energy. In the usual case, a transmitter produces a pulse of audio frequency energy which is supplied to the transducer. The transducer converts this electrical energy into sound energy which is radiated into the water. After producing a pulse of energy the transmitter becomes quiescent, that is, it does not produce an output pulse, and the same transducer listens for an echo. The echo received by the transducer is converted into electrical energy which is subsequently amplified so that data can be extracted from the received signal, such as to the range and type of object causing the echo.

Heretofore, the devices used to switch transducers between the receiver portion of the sonar system and the transmitter portion have usually been of the mechanical or semiconductor type. While these types of switches generally perform their intended function of changing the function of the transducer from transmit to listen and vice versa, they have several disadvantages. First of all, they both have the characteristic that when the sonar system is "listening," the transmitter is still in operative circuit relationship with the transducer and/or receiver since the switches have some finite resistance. Therefore, when listening, the transmitter inserts two undesired actions into the system, these being noise and impedance. Additionally, prior art switching systems of the foregoing types require some mechanical or electronic synchronization so that the switches will be actuated at the proper time for transmitting and listening operations.

In general, it would be desirable to effectively completely remove, or short out, the output of the transmitter during the listening operation so that the disadvantageous effects discussed above could not occur. However, heretofore this has not been able to be readily accomplished.

*Summary of the invention*

The present invention provides a novel type of a switch which has particular utility for sonar applications although it can be used elsewhere. In accordance with the switch of the invention, a saturable reactor is utilized in conjunction with a transmitter. The saturable reactor is controlled by the output signal from the transmitter to switch from a high impedance to a low impedance state. In the low impedance state the residual inductance of the saturable reactor is removed by a capacitor which resonates with the inductance leaving essentially only the direct current resistance components of the switch present in the circuit. The two available impedance states controlled directly by the transmitter without the need of a synchronizing circuit permits the switch to be connected in the system in a manner to effectively isolate the transmitter from the line during the listen mode of operation of the sonar system. In one such arrangement the switch is connected to the transmitter to produce a substantially zero impedance across the transmitter when it is operative thereby removing the effects of the transmitter from the receiver.

It is therefore an object of the present invention to provide a magnetic switch which is readily switched from a high impedance to a low impedance state.

A further object is to provide a magnetic saturable reactor type switch in which the impedance of the switch in the low impedance state is substantially its DC resistance components.

An additional object is to provide a magnetic switch using a saturable reactor in combination with a transmitter-receiver system in which an element of the system controls the operation of the switch from a high impedance to a low impedance state.

Still another object is to provide a saturable reactor type magnetic switch for use in combination with a sonar system in which the sonar transmitter operates the switch to cause the switch to isolate the transmitter from the sonar receiver during the listen mode of operation of the system.

Other objects and advantages of the present invention will become more apparent upon reference to the following specification and annexed drawings, in which, FIG. 1 is a schematic diagram of one form of switch made in accordance with the invention;

FIG. 1A is a partially schematic and partially pictorial drawing of a typical saturable reactor utilizable with the present invention;

FIGS. 2A and 2B are schematic diagrams of the equivalent circuits of the saturable reactor switch under large and small amplitude signal input conditions;

FIG. 3 is a graph showing the impedance of the switch of FIG. 1 as a function of input voltage;

FIGS. 4A and 4B respectively show the hysteresis curves for a saturable reactor under large and small amplitude input signal voltage conditions;

FIG. 5 shows in block diagram form one arrangement for connecting the switch of the present invention into a sonar system.

Referring to FIGS. 1 and 1A, the switch 5 of the present invention includes a conventional saturable reactor device 10 having a pair of cores 11 and 12 which are of a "soft" magnetizable material, that is, a material which has a narrow, substantially rectangular, hysteresis loop and high permeability. Both cores of the reactor have the conventional series connected gate windings 14 and 15, wound thereon respectively. A common control winding 16 threads both of the cores.

As shown in the configuration of FIG. 1, switch 5 operates from a source of alternating current voltage 20 connected to input terminals 1 and 2. In the embodiment being described, source 20 for example represents the output of a sonar transmitter producing an audio frequency output voltage E. A capacitor 22 is connected in series with the gate windings and switch input terminal 1 or 2. The purpose of capacitor 22 is described in detail below.

The control winding 16 is operated by a direct current (DC) control current produced by any suitable DC source, represented by battery 26, connected to terminals 2 and 3. A resistor 28 is connected in series with the control winding. In general, it can be considered that the saturable reactor 10, the voltage source 20 and the capacitor 22 form an alternating current section of the device while the control winding 16, control current source 26 and resistor 28 form a DC portion of the device.

The saturable reactor configuration shown in FIG. 1A is only one of a number of conventional types which can be used with the present invention. Of course, the material for the cores is selected in accordance with the hysteresis loop desired and the number of turns for the gate and control windings are calculated for the desired reaction of the switch in accordance with conventional design practices.

FIG. 4A shows the substantially rectangular hysteresis loops 30 of the cores 11 and 12. As is usual, the ordinate of the curve represents B (the magnitude of flux density) and the abscissa represents H (the magnitude of the field). The main hysteresis loop 30 has a pair of minor loops 30–1 and 30–2 corresponding to a minor loop formed in the respective cores 11 and 12 in response to applied AC voltage signal from source 20.

The familiar expression:

(1) $$B = \frac{1}{N_g A} \int e\, dt$$

shows that the flux level of the minor loops 30–1 and 30–2 is determined by the applied voltage from the source 20. Here, $N_g$ = the number of turns of the gate winding on the saturable reactor
$A$ = the area of the core
$\int e\, dt$ = the instantaneous applied input voltage to the gate winding When the applied voltage from the source 20 is large, the minor loops 30–1 and 30–2 appear as shown in FIG. 4A. The current flowing in the gate circuit of coils 14 and 15 will follow the "Equal Ampere Turns Law," given as:

(2) $$I_g = \frac{N_c}{N_g} I_c$$

where $I_c$ = current of the control winding
$N_c$ = number of turns in control winding
$I_g$ = current of the gate winding
$N_g$ = number of turns in gate winding As is typical in this type of saturable reactor device, as the voltage from the source 20 is increased, thereby increasing the magnitude of the magnetic field H, the cores eventually saturate so that further increase in H does not produce any additional increase in B. This saturation is shown by the areas 32–4 and 32–2 in FIG. 4A. When the cores are saturated, further increase in the applied input voltage E does not produce a consequent increase in the gate current $I_g$. Of course, the control current $I_c$ determines the input signal level at which the cores saturate.

After the cores saturate the gate current $I_g$ remains relatively constant for further increase of the applied voltage E. Thus, since the absolute value of the magnitude of the impedance |Z| of the switch of FIG. 1 at terminals 1 and 2 is equal to $$|Z| = \frac{E}{I}$$

|Z| becomes primarily voltage dependent after saturation and increases with E. Therefore, the impedance at terminals 1 and 2 can increase to a high value as E becomes large. This is shown in FIG. 3 in graphical form.

The equivalent circuit of the switch of FIG. 1 under large voltage input conditions is shown in FIG. 2A. This condition produces a saturated magnetic core in which the control winding has no effect. The switch can therefore be represented by the two inductances of the windings 14 and 15 of the saturable reactor. The 90° phase shift corresponds to the phase lag of the current through the inductors with respect to the applied voltage. The reactance of the capacitor 22 is negligible under this condition since this inductance is large. As indicated in FIG. 4A, the control current levels $I_c$ for both cores 11 and 12 have very little effect on the hysteresis loop, with a condition of a large amplitude applied voltage. Also, as shown in FIG. 3, Z of the switch can be made large by using a large amplitude E.

As shown in FIG. 3 as the amplitude of the applied AC voltage decreases, the impedance of the switch at terminals 1 and 2 falls. When the amplitude of the applied AC voltage is reduced low enough, the minor loops 30–1 and 30–2 of the hysteresis loop collapse. However, the inherent nature of the gate windings is such that there is some residual inductance due to the windings and the incomplete saturation of the core material. In this case, under small signal conditions, the two cores effectively combine as one and the combined residual minor hysteresis loops come together to form the single loop 40 of FIG. 4B. The equivalent inductance of the gate circuit can now be stated as (3) $$L = K \frac{N_g^2 A}{E} u$$

where $L$ = the length of the magnetic path
$N_g$ = number of turns of gate winding
$A$ = area of the cores
$u$ = permeability of the cores
$K$ = a constant The permeability $u$ is a function of the ratio of $B/H$ and can be easily changed by changing the control current. Thus, a second curve 41 is shown in FIG. 4B for a different value $u$ produced by a greater value of control current $I_c$. Note that the change of control current effectively changes the inductance of the switch in accordance with Equation 3, which is dependent on $u$.

If the switch 5 is used with the residual inductance of the gate circuit remaining, under small amplitude signal conditions there would still be a relatively high impedance present across terminals 1 and 2. It is for this reason that the capacitor 22 is inserted in series with the coils 11 and 12. Capacitor 22 is selected to have a value of capacitance which will resonate with the residual inductance of the two cores and the gate circuit at a particular frequency of AC input signal from source 20. This arrangement forms a series resonant circuit thereby cancelling out the residual inductance of the cores and gate circuit. At this time, the switch has only an equivalent resistance equal to the copper resistance coil loss. This is shown in FIG. 2B where Req represents this resistance. Consequently, under low amplitude signal input conditions, switch 5 effectively forms a short circuit across therminals 1 and 2, or at least a circuit of very low impedance. This low impedance state of the switch can be changed to one of high impedance merely by increasing the amplitude of the input signal until the cores saturate.

During production the value of the capacitor 22 can vary from one switch to another, and the cores and windings can differ from one saturable reactor to another. The switch of the present invention provides an easy way to tune the resonant circuits to compensate for these variations. All that is necessary is to change the control current. This changes the formation of the minor loops and the permeability, $u$. Since the residual inductance of the switch is dependent upon $u$, changing the control current varies the value of the inductance to resonate with a fixed value of capacitor. Thus, all of the switches fabricated on a single production line can be adjusted for nearly perfect resonance at any given frequency by selection of a very narrow range of values for the resistors 28 of FIG. 1 when operating the switch from a control voltage of a predetermined value $V_{DC}$.

It should be understood that the minor loops shown in FIG. 4B are stable with small amplitude applied voltage.

Thus, the switch impedance is constant from zero applied voltage to the point where the minor loops start to drop out and the major loop is produced. The low value, constant impedance operation is shown by the horizontal line portion of the impedance curve in FIG. 3. The inherent current limiting action of the saturable reactor (AC) section protects the series resonating capacitor when a large voltage is applied from source 20. The entire circuit goes out of resonance at this time since the reactance of the coils is greater than that of the capacitor. Thus, there will be only a small voltage drop produced across capacitor 22 by the voltage divider action.

FIG. 5 shows a typical application for the switch 5 of the present invention. Here, terminals 1 and 2 of the switch are connected to the outputs of a conventional sonar transmitter, which is actually a high power amplifier of audio frequency signals produced by an oscillator 60. Terminal 2 of the switch and the lower output line of transmitter 50 are connected to ground and the coils 14 and 15 are connected across the two transmitter output leads. The output of switch 5 is connected across the input of a transducer 52, which is of any suitable type, ceramic, magnetostrictive, piezoelectric, etc. One line of the transducer input is also connected to ground. The high side input lead from the transducer 52 is also connected to the high side input 56 of a conventional sonar receiver whose other input line is connected to ground.

In accordance with the operation of the switch discussed above, when the transmitter is operating and producing a high amplitude output voltage, the switch produces a high impedance across terminals 1 and 2. This high impedance is usually equal to or higher than the impedance of the transducer 52 and, consequently, there is good power transfer from the transmitter 50 to transducer 52 so that the transducer functions normally to radiate the signal. When the transmitter is shut off during the "listen" period and produces substantially a zero amplitude output signal, as explained previously the impedance across terminals 1 and 2 is essentially very low or close to zero. Therefore, the transmitter output is effectively shorted out by the switch and the signals received by the transducer and converted into electrical energy are coupled back to the receiver 56. The capacitor 57 in the receiver lines passes the returned AC signal and prevents the switch 5 from shorting out the receiver input during the "listen" mode.

Two diodes 61 are connected with opposite polarity across the two receiver input lines. These diodes protect the receiver when the transmitter is operating and producing a high amplitude output signal. As should be apparent, these two diodes 61 will conduct under high amplitude signal conditions and short the transmitter output signal to ground at the receiver input. The low DC resistance of the diodes is blocked from the transducer by capacitor 57. Under small amplitude signal conditions, which exist when the transducer 52 is acting as a receiving device, the received signals are in the order of millivolts. The diodes 61 are high impedance devices under this condition and they do not conduct so that the signal produced by the transducer is coupled to the receiver.

As explained previously, the switch of the subject invention will operate over a wide range of input frequencies to produce the low impedance state merely by changing the control current to change the inductance of the switch to resonate with the fixed value capacitor 22. This can be done automatically in accordance with another feature of the circuit of FIG. 5. Here oscillator 60 has a variable frequency output in accordance with a manually operated or programmed control (not shown). A portion of the output signal from the oscillator is tapped off and supplied to a discriminator circuit 62 through an AC amplifier 70 and a dummy switch 5'. The discriminator is of conventional construction and produces a varying direct current voltage of positive and negative character, corresponding to the difference from a predetermined center frequency of the signal produced by the oscillator 60.

The DC output signal of the discriminator is supplied to a DC amplifier 64 which drives the control circuit of dummy switch 5', that is identical to all the switches in the system. The dummy switch 5' is wired in series so that the control voltage is developed during the "listen" period. This avoids a drain on oscillator 60 during transmit. The DC voltage is applied to the control winding 16 to produce a control current through the resistor 28. The value of the output voltage from the DC amplifier is thus automatically selected so that the control current changes in accordance with the frequency change of oscillator 60 to produce a resonant circuit at the particular frequency of the signal being produced by the oscillator 60. Thus, the low impedance state of the magnetic switch, in which only the resistance of the coils and the core of the gate circuit are present, is maintained for any frequency output signal of the transmitter.

As should be apparent, where an array of transducers is used in a sonar system, a switch 5 is preferably provided between the sonar transmitter and each transducer. Thus, the transducers are isolated from the transmitter when the scanning circuit removes the high voltage therefrom.

As indicated above, the switch of the present invention is switched from a high to low impedance state, and vice versa, without the use of any extra components or synchronizing circuits. Also, the use of the resonating capacitor reduces the impedance of the switch in its low impedance state to optimize the low voltage to high voltage switching effect. Further, the DC control current is utilized for both limiting the gate current with large amplitude applied voltage, by controlling the saturation of the cores, and to compensate for tolerance variations in capacitor values in the coils and cores. The DC control current also permits the switch to be readily tuned for different frequencies of operation.

While the switch of the present invention is shown for use in a sonar system, it has other applications. For example, it can be used between a VLF radio transmitter-receiver system and a common antenna. In this case it would replace an element such as a hybrid coupler. Here, it might be necessary to bypass the high frequency carrier wave signal around the switch, by use of suitable filters, and to operate the saturable reactor by using a portion of the modulating signal.

While preferred embodiments of the invention have been described above, it will be understood that these are illustrative only, and the invention is limited solely by the appended claims.

What is claimed:
1. A magnetic switch comprising
   magnetically reactive means for connection to a source of alternating current voltage signals, said magnetically reactive means having a high impedance in response to high amplitude voltage signals from the source and a low impedance in response to low amplitude voltage signals,
   and a capacitor connected to said magnetically reactive means to resonate with the residual inductance present in response to low amplitude voltage signals of a particular frequency.
2. A switch as in claim 1 further comprising control means for changing the operating characteristics of the magnetically reactive means thereby varying the residual inductance and the frequency of the signals from the source at which said capacitor resonates with the residual inductance.
3. A switch as in claim 2 wherein said magnetically reactive means includes saturable reactor means having a pair of cores of magnetic material and a gate winding therefor and said control means comprises a control winding for the cores.
4. A switch as in claim 2 wherein the capacitor is connected in series between the source of applied voltage and the saturable portion of the magnetically reactive means to form a series resonant circuit.

5. A switch as in in claim 3 wherein the capacitor is connected in series between the source of applied voltage and the saturable portion of the magnetically reactive means to form a series resonant circuit.

6. The switch of claim 1 in combination with a transmitter system further comprising transmitter means having an output, utilization means and means connecting said switch to the transmitter output and to said utilization means to couple energy from the transmitter to the utilization means in response to high amplitude voltage signals from the transmitter and to decrease the coupling between the transmitter and utilization means in response to lower amplitude signals.

7. The combination of claim 6 for use in a sonar transmit-receive system wherein said utilization means is a sound transducer for radiating energy produced by the transmitter means and further comprising a receiver means connected to said transducer means to receive echoes received by said utilization means.

8. The combination of claim 7 further comprising means connecting said switch to said transmitter means to place the low impedance of the switch in its low impedance state in shunt across the output of said transmitter means in response to a low amplitude output signal from said transmitter means.

9. In combination with a sonar transmit-receive system having transmitter means, receiver means, and a common transducer means; magnetic switch means, means connecting said switch means to the output of said transmitter means to receive the output signals therefrom, said switch means having a high impedance state in response to high amplitude signals from the transmitter and a low impedance state in response to low amplitude signals, utilization means, and means connecting said switch means to said system and said utilization means to effect substantial isolation of the transmitter from the receiver means when the transmitter is inoperative and to couple energy to the utilization means when the transmitter is operative.

10. The combination of claim 9 further comprising a capacitor means connected to said switch means to counteract the effect of the residual inductance of the switch means when the switch means is in the low impedance state.

11. The combination of claim 10 wherein said capacitor means resonates with the residual inductance at a particular frequency of signal applied to the switch, and means connecting the capacitor means and residual inductance in a series circuit.

12. The combination of claim 11 further comprising control means connected to said switch means for changing the operating characteristics of the switch means to vary its residual inductance and the frequency of the signals applied to the switch at which the capacitor means resonates with the residual inductance.

13. The combination of claim 12 further comprising variable frequency oscillator means for said transmitter means, means connected to said oscillator means and to said control means and responsive to the frequency of said oscillator means for producing a signal to operate said control means.

References Cited
UNITED STATES PATENTS

| 3,102,991 | 9/1963 | Jess | 340—3 |
| 3,312,831 | 4/1967 | Crane et al. | 307—88 |
| 3,327,129 | 6/1967 | Best | 307—88 |

RICHARD A. FARLEY, *Primary Examiner.*